(12) United States Patent
Kim et al.

(10) Patent No.: US 11,450,906 B2
(45) Date of Patent: Sep. 20, 2022

(54) SECONDARY CYLINDRICAL BATTERY HAVING PIEZOELECTRIC ELEMENT AND THERMOELECTRIC ELEMENT

(71) Applicant: LG CHEM, LTD., Seoul (KR)

(72) Inventors: Minkyung Kim, Daejeon (KR); Sora Lee, Daejeon (KR); Duk Hyun Ryu, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 225 days.

(21) Appl. No.: 17/040,392

(22) PCT Filed: Nov. 13, 2019

(86) PCT No.: PCT/KR2019/015460
§ 371 (c)(1),
(2) Date: Sep. 22, 2020

(87) PCT Pub. No.: WO2020/111595
PCT Pub. Date: Jun. 4, 2020

(65) Prior Publication Data
US 2021/0021005 A1  Jan. 21, 2021

(30) Foreign Application Priority Data
Nov. 30, 2018 (KR) .................. 10-2018-0152912

(51) Int. Cl.
*H01M 10/6553* (2014.01)
*H01M 10/613* (2014.01)
*H01M 10/643* (2014.01)
*H01M 10/6572* (2014.01)
*H01M 50/531* (2021.01)
(Continued)

(52) U.S. Cl.
CPC ..... *H01M 10/6553* (2015.04); *H01M 10/613* (2015.04); *H01M 10/643* (2015.04);
(Continued)

(58) Field of Classification Search
CPC .......... H01M 10/6553; H01M 10/613; H01M 10/643; H01M 10/6572; H01M 50/531;
(Continued)

(56) References Cited

U.S. PATENT DOCUMENTS 5,378,551 A   1/1995 Meadows et al.
2007/0122691 A1   5/2007 Lee et al.
(Continued)

FOREIGN PATENT DOCUMENTS

JP   9-503333 A   3/1997
JP   2005-209395 A   8/2005
(Continued)

OTHER PUBLICATIONS

International Search Report for PCT/KR2019/015460 dated Mar. 3, 2020.
(Continued)

*Primary Examiner* — Eugenia Wang
(74) *Attorney, Agent, or Firm* — Birch, Stewart, Kolasch & Birch, LLP

(57) ABSTRACT

A cylindrical rechargeable battery including a positive electrode, a negative electrode, and a separator is provided. The positive electrode includes a positive electrode tab, and a piezoelectric element and a thermoelectric element are formed at edges of the positive electrode tab.

11 Claims, 7 Drawing Sheets

(51) Int. Cl.
*H01M 50/533* (2021.01)
*H01M 10/0525* (2010.01)

(52) U.S. Cl.
CPC ..... *H01M 10/6572* (2015.04); *H01M 50/531* (2021.01); *H01M 50/533* (2021.01); *H01M 10/0525* (2013.01)

(58) Field of Classification Search
CPC ............. H01M 50/533; H01M 50/534; H01M 50/536; H01M 50/538; H01M 50/54; H01M 50/541
See application file for complete search history.

(56) References Cited

U.S. PATENT DOCUMENTS

2011/0233932 A1   9/2011   Zawoy et al.
2012/0276427 A1   11/2012  Kim

FOREIGN PATENT DOCUMENTS

| | | |
|---|---|---|
| JP | 2012-122393 A | 6/2012 |
| JP | 2013-251267 A | 12/2013 |
| JP | 2017-98149 A | 6/2017 |
| KR | 10-2006-0033064 A | 4/2006 |
| KR | 10-2007-0056494 A | 6/2007 |
| KR | 10-2008-0047634 A | 5/2008 |
| KR | 10-2011-0015070 A | 2/2011 |
| KR | 10-2012-0121220 A | 11/2012 |
| KR | 10-1293177 B1 | 8/2013 |
| KR | 10-2018-0054077 A | 5/2018 |
| KR | 10-2020-0028712 A | 3/2020 |

OTHER PUBLICATIONS

Extended European Search Report for European Application No. 19888362.1, dated Apr. 29, 2021.

SECONDARY CYLINDRICAL BATTERY HAVING PIEZOELECTRIC ELEMENT AND THERMOELECTRIC ELEMENT

TECHNICAL FIELD

This application claims priority to and the benefit of Korean Patent Application No. 10-2018-0152912 filed in the Korean Intellectual Property Office on Nov. 30, 2018, the entire contents of which are incorporated herein by reference.

The present invention relates to a cylindrical rechargeable battery including a piezoelectric element and a thermoelectric element.

BACKGROUND ART

Recently, there has been a growing interest in rising prices of energy sources caused by depletion of fossil fuels as well as environmental pollution, and a demand for environmentally-friendly alternative energy sources has become an indispensable factor for future life. Accordingly, research on various electric power production technologies such as atomic power, solar power, wind power, tidal power, etc. continues, and electric power storage devices for more efficient use of the generated energy are also drawing attention.

Moreover, as technology development and demand for mobile devices and battery cars increases, the demand for batteries as energy sources is rapidly increasing, and accordingly, many studies on batteries capable of meeting various demands have been conducted. In particular, in terms of materials, there is a high demand for lithium rechargeable batteries such as lithium ion batteries, lithium ion polymer batteries, and the like which have advantages such as high energy density, discharge voltage, and output stability.

Such rechargeable batteries are classified depending on a structure of an electrode assembly in which a positive electrode, a negative electrode, and a separator interposed between the positive electrode and the negative electrode are stacked. Representative examples thereof may include a jelly-roll type (wound-type) of electrode assembly in which a positive electrode and a negative electrode having a long sheet-like shape are wound with a separator interposed therebetween, a stacked type of electrode assembly in which a plurality of positive electrodes and negative electrodes that are cut in a predetermined size unit are sequentially stacked with separators interposed therebetween, and the like. Recently, a stack/folding type of electrode assembly in which unit cells obtained by stacking positive and negative electrodes of a predetermined unit with separators interposed therebetween, which are disposed on a separation film, are sequentially wound has been developed as an electrode assembly having an advanced structure in which the jelly-roll type and the stack type are mixed in order to solve problems of the jelly-roll types and the stack types of electrode assemblies.

Such electrode assemblies are accommodated in a pouch case, a cylindrical can, a rectangular case, or the like depending on the purpose of use, to manufacture batteries.

Among them, the cylindrical battery has the advantages of easy manufacturing and high energy density per unit weight, and is used as an energy source of various devices ranging from portable computers to battery cars. A content of silicon is increased in a negative electrode active material in order to maximize a high energy density advantage. In this case, silicon has large volume expansion during charge and discharge of the battery, which causes a lot of stress in the battery during repeated volume expansion of the negative electrode. Graphite has a relatively small volume expansion compared to silicon, but it also causes volume expansion and stress. In particular, there is a problem that the stress is concentrated in a stepped portion of the two electrodes.

In addition, in the case of a high density and high capacity battery, such as a cylindrical battery, there is a problem that a lot of heat energy is generated in the charging and discharging process and it is required to control it effectively.

Therefore, there is a need for a technique that can fundamentally solve this problem.

DISCLOSURE

Technical Problem

An object of the present invention is to solve the problems of the prior art and technical problems from the past.

The inventors of the present application confirmed that a stress generated by the expansion of the negative electrode may be converted into electrical energy to control thermal energy using the electrical energy, by installing a piezoelectric element and a thermoelectric element in the positive electrode tab, thereby completing the present invention.

Technical Solution

A cylindrical rechargeable battery according to the present invention for achieving this purpose may include a positive electrode, a negative electrode, and a separator. The positive electrode may include a positive electrode tab having a pair of opposed edges, and a piezoelectric element at at least one edge of the pair of opposed edges of the positive electrode tab, and a thermoelectric element at the positive electrode tab.

The positive electrode tab may have a rectangular strip shape having a long length in comparison with a width.

The thermoelectric element may be formed at another edge of the pair of opposed edges of the positive electrode tab in a longitudinal direction thereof.

Accommodating spaces in which the piezoelectric element and the thermoelectric element are mountable may be formed at the pair of opposed edges of the positive electrode tab.

The accommodating spaces may have a stepped shape. Only the piezoelectric element may be formed at both edges of the pair of opposed edges of the positive electrode tab.

The thermoelectric element may be formed at a central portion of the positive electrode tab.

An indentation may be formed into the positive electrode tab.

The thermoelectric element may be accommodated in the indentation.

The electrical energy generated by the piezoelectric element may be transferred to the thermoelectric element through the positive electrode tab.

Two or more of the positive electrode tabs may be formed in the positive electrode.

The negative electrode is manufactured by applying and drying a negative electrode active material on a negative electrode current collector, and optionally, additional components may be further included.

The negative electrode collector is typically formed to have a thickness of 3 to 500 μm. Such a negative electrode current collector is not particularly limited as long as it has conductivity without causing chemical change in the battery, and for example, copper, stainless steel, aluminum, nickel, titanium, calcined carbon, or copper or stainless steel, a surface of which is treated with the carbon, nickel, titanium, silver, aluminum-cadmium alloy, or the like, may be used. In addition, like the positive electrode current collector, fine concavities and convexities may be formed on a surface of the negative electrode current collector to enhance the bonding strength of the negative electrode active material, and it may be used in various forms such as a film, a sheet, a foil, a net, a porous body, a foam, and a nonwoven fabric.

For example, carbon such as hardly graphitized carbon and graphite-type carbon; a metal composite oxide such as $Li_xFe_2O_3$ (0≤x≤1), $Li_xWO_2$ (0≤x≤1), $Sn_xMe_{1-x}Me'_yO_z$ (Me: Mn, Fe, Pb, and Ge; Me': Al, B, P, Si, Group 1, Group 2, and Group 3 elements of the periodic table, and halogen; 0<x≤1; 1≤y≤3; 1≤z≤8); a lithium metal; a lithium alloy; a silicon-based alloy or a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; a Li—Co—Ni based material; and the like may be used as the negative electrode active material.

The negative electrode active material may contain 25% or less of silicon.

A cylindrical rechargeable battery according to the present invention may include a positive electrode, a negative electrode, and a separator. The negative electrode may include a negative electrode tab having a pair of opposed edges, a piezoelectric element at at least one edge of the pair of opposed edges of the negative electrode tab, and a thermoelectric element at the negative electrode tab.

MODE FOR INVENTION

The present invention will be described more fully hereinafter with reference to the accompanying drawings, in which exemplary embodiments of the invention are shown. As those skilled in the art wherein realize, the described embodiments may be modified in various different ways, all without departing from the spirit or scope of the present invention.

In addition, unless explicitly described to the contrary, the word "comprise" and variations such as "comprises" or "comprising" will be understood to imply the inclusion of stated elements but not the exclusion of any other elements.

In addition, throughout the specification, when referred to as "cross-section", it indicates when a cross-section which cuts a target part vertically is seen from the side.

In addition, throughout the specification, when referred to as "top view", it indicates when a target portion is viewed from above.

Further, since a structure and an operating principle of the "piezoelectric element" and the "thermoelectric element" are known techniques, a description thereof will be omitted.

Figure 1:
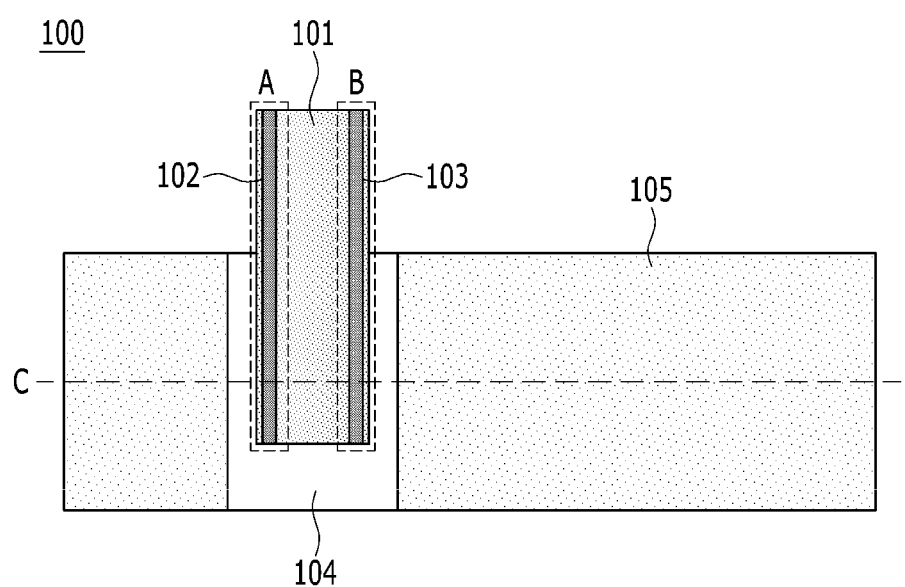
FIG. 1 illustrates a plan view of a cylindrical rechargeable battery in which a piezoelectric element and a thermoelectric element are formed at a positive electrode tab thereof according to an exemplary embodiment of the present invention.
Figure 2:
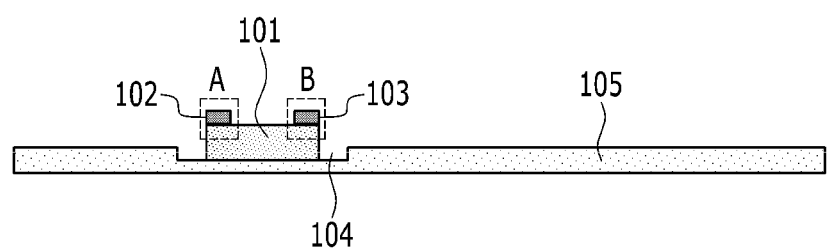
FIG. 2 illustrates a cross-sectional view taken along a dotted line C of FIG. 1.

FIG. 1 illustrates a plan view of a cylindrical rechargeable battery in which a piezoelectric element and a thermoelectric element are formed at a positive electrode tab thereof according to an exemplary embodiment of the present invention. FIG. 2 illustrates a cross-sectional view taken along a dotted line C of FIG. 1.

Referring to FIG. 1 and FIG. 2, a piezoelectric element 102 and a thermoelectric element 103 are formed at edges A and B of a positive electrode tab 101 of a cylindrical rechargeable battery 100. For convenience of explanation, FIG. 1 illustrates an enlarged view of a portion where the positive electrode tab 101 is formed at an uncoated portion 104 of a positive electrode 105 before the positive electrode 105 and a negative electrode (not illustrated) are wound with the separator interposed therebetween.

The positive electrode tab 101 may have a rectangular strip shape having a long length in comparison with a width. The piezoelectric element 102 and the thermoelectric element 103 may be formed at opposite edges A and B in a longitudinal direction. As described above, the edges A and B are portions where stresses generated by repeated expansion of the negative electrode (not illustrated) are concentrated during charging and discharging of the cylindrical rechargeable battery 100. This stress may be converted into battery energy through the piezoelectric element 102. In addition, the battery energy may operate the thermoelectric element 103 to absorb thermal energy generated in the cylindrical rechargeable battery 100 during the charge and discharge process. The electrical energy produced by the piezoelectric element 102 may be transferred to the thermoelectric element 103 through various paths. For example, the electrical energy may be transferred through a metal connector (not illustrated) electrically connecting to the piezoelectric element 102 and the thermoelectric element 103. Meanwhile, in the exemplary embodiments illustrated in FIG. 1 to FIG. 6, the electrical energy generated by the piezoelectric element 102 may be transferred to the thermoelectric element 103 through the positive electrode tab 101.

In particular, a portion where the positive electrode tab 101 is formed is a portion where a lot of thermal energy is intensively generated by a rapid flow of current in the charging and discharging process of the cylindrical rechargeable battery 100. This thermal energy may be absorbed and controlled by the thermoelectric element 103.

Figure 3:
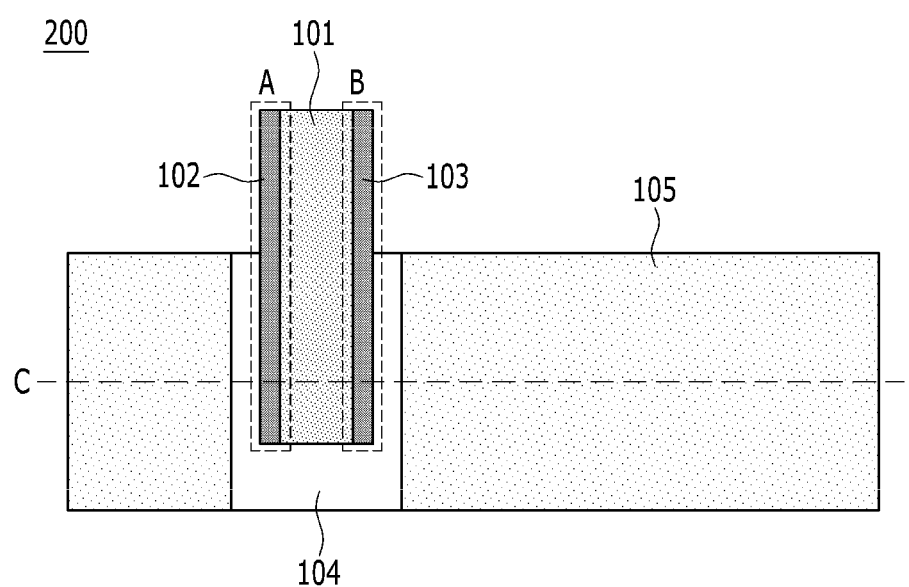
FIG. 3 illustrates a top plan view according to another exemplary embodiment of the present invention.
Figure 4:
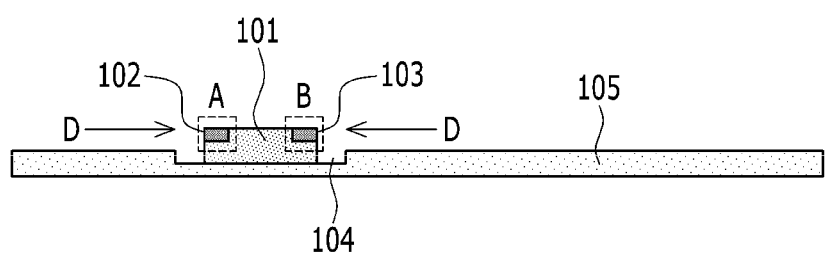
FIG. 4 illustrates a cross-sectional view taken along a dotted line C of FIG. 3.
Figure 5:
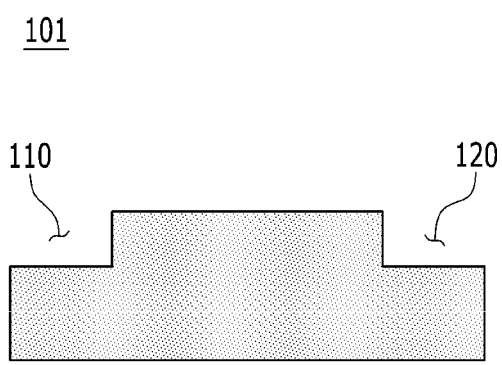
FIG. 5 illustrates a cross-sectional view of an electrode tab taken along the dotted line C of FIG. 3.

FIG. 3 illustrates a top plan view according to another exemplary embodiment of the present invention. FIG. 4 illustrates a cross-sectional view taken along a dotted line C of FIG. 3. FIG. 5 illustrates a cross-sectional view of an electrode tab taken along the dotted line C of FIG. 3.

Referring to FIG. 3 to FIG. 5, accommodating spaces 110 and 120 in which the piezoelectric element 102 and the thermoelectric element 103 are mountable may be formed at opposite edges A and B of the positive electrode tab 101 of a cylindrical rechargeable battery 200. A form of the accommodating spaces 110 and 120 is not particularly limited, but as an example, it may be formed in the form of a step. An entire part or a portion of the piezoelectric element 102 may be formed in the accommodating space 110 of the edge A. An entire part or a portion of the thermoelectric element 103 may be formed in the accommodating space 120 of the edge B.

Through this structure, the piezoelectric element 102 and the thermoelectric element 103 of various shapes and volumes may be applied to the positive electrode tab 101, and the piezoelectric element 102 and the thermoelectric element 103 may be prevented from escaping from the positive electrode tab 101 by a stress generated in a direction D during the charge and discharge process. Herein, the direction D indicates a direction perpendicular to a longitudinal direction of the positive electrode tab 101 in a direction parallel to a surface where the positive electrode 105 is formed with respect to the ground.

Figure 6:
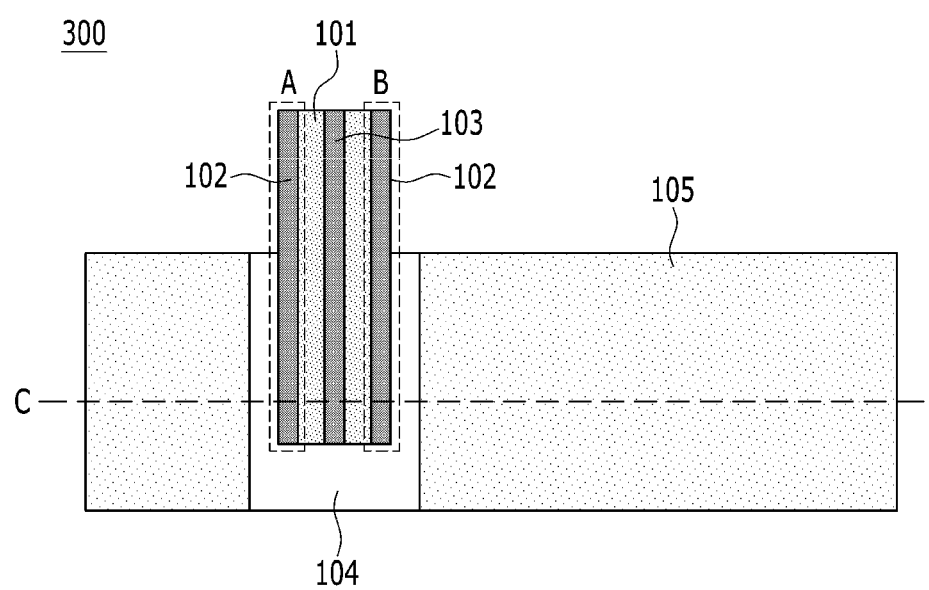
FIG. 6 illustrates a top plan view according to another exemplary embodiment of the present invention.
Figure 7:
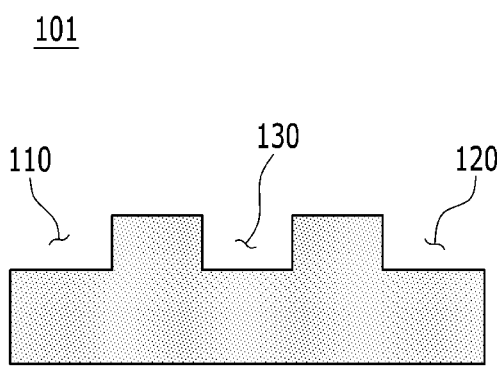
FIG. 7 illustrates a cross-sectional view of an electrode tab taken along the dotted line C of FIG. 3.

FIG. 6 illustrates a top plan view according to another exemplary embodiment of the present invention. FIG. 7 illustrates a cross-sectional view of an electrode tab taken along the dotted line C of FIG. 6.

Referring to FIG. 6 and FIG. 7, the piezoelectric element 102 may be formed at edges A and B of the positive electrode tab 101 of a cylindrical rechargeable battery 300, and the thermoelectric element 103 may be formed at a central portion of the positive electrode tab 101.

As described above, the edges A and B are portions where stresses generated by repeated expansion of the negative electrode (not illustrated) are concentrated during charging and discharging of the cylindrical rechargeable battery 300. Therefore, only the piezoelectric element 102 may be installed at the edges A and B to secure more battery energy. In addition, it is possible to easily control the high thermal energy generated in the cylindrical rechargeable battery 300 of high capacity and high output by operating the thermoelectric element 103 with the battery energy.

The accommodating spaces 110 and 120 in which the piezoelectric element 102 is mountable may be formed at opposite edges A and B of the positive electrode tab 101. A form of the accommodating spaces 110 and 120 is not particularly limited, but as an example, they may be formed in the form of a step. An entire part or a portion of the piezoelectric element 102 may be formed in the accommodating spaces 110 and 120 of the edges A and B.

An indentation 130 in which the thermoelectric element 103 is accommodatable may be formed in a central portion of the positive electrode tab 101. The indentation 130 may be formed to have a structure indented into the positive electrode tab 101, and an entire part or a portion of the thermoelectric element 103 may be accommodated in the indentation 130. Through this structure, the thermoelectric element 103 of various shapes and volumes may be applied to the positive electrode tab 101. In addition, an area in which the thermoelectric element 103 contacts the positive electrode tab 101 may be maximized so that thermal energy generated in the positive electrode tab 101 may be quickly transferred to the thermoelectric element 103 to be cooled.

As a modified example, the piezoelectric element 102 and the thermoelectric element 103 described above may be equally applied to the negative electrode tab (not illustrated).

Those of ordinary skill in the field of the present invention will be able to make various applications and modifications within the scope of the present invention based on the contents.

INDUSTRIAL APPLICABILITY

As described above, in the rechargeable battery according to the exemplary embodiment of the present invention, the piezoelectric element and the thermoelectric element are formed on the positive electrode tab, thereby changing the stress generated during the expansion of the negative electrode to electrical energy using the piezoelectric element, and the electrical energy may be used to operate the thermoelectric element to thereby control the thermal energy issued inside the battery.

The invention claimed is:

1. A cylindrical rechargeable battery comprising:
   a positive electrode, the positive electrode including:
      a positive electrode tab having a pair of opposed edges;
      a piezoelectric element at at least one edge of the pair of opposed edges of the positive electrode tab;
      and a thermoelectric element at the positive electrode tab;
   a negative electrode; and
   a separator.

2. The cylindrical rechargeable battery of claim 1, wherein
   the positive electrode tab has a rectangular strip shape having a long length in comparison with a width.

3. The cylindrical rechargeable battery of claim 2, wherein
   the thermoelectric element is formed at another edge of the pair of opposed edges of the positive electrode tab in a longitudinal direction thereof.

4. The cylindrical rechargeable battery of claim 1, wherein
   accommodating spaces in which the piezoelectric element and the thermoelectric element are mountable are formed at the pair of opposed edges of the positive electrode tab.

5. The cylindrical rechargeable battery of claim 4, wherein
   the accommodating spaces have a stepped shape.

6. The cylindrical rechargeable battery of claim 1, wherein
   the piezoelectric element is formed at both edges of the pair of opposed edges of the positive electrode tab.

7. The cylindrical rechargeable battery of claim 6, wherein
   the thermoelectric element is formed at a central portion of the positive electrode tab.

8. The cylindrical rechargeable battery of claim 7, wherein
   an indentation is formed into the positive electrode tab.

9. The cylindrical rechargeable battery of claim 8, wherein
   the thermoelectric element is accommodated in the indentation.

10. The cylindrical rechargeable battery of claim 1, wherein
    electrical energy generated by the piezoelectric element is transferred to the thermoelectric element through the positive electrode tab.

11. A cylindrical rechargeable battery comprising:
    a positive electrode;
    a negative electrode, the negative electrode includes including:
       a negative electrode tab having a pair of opposed edges;
       a piezoelectric element at at least one edge of the pair of opposed edges of the negative electrode tab; and
       a thermoelectric element at the negative electrode tab; and
    a separator.

* * * * *